(12) United States Patent
Noguchi et al.

(10) Patent No.: US 6,493,226 B1
(45) Date of Patent: Dec. 10, 2002

(54) RADIATION STRUCTURE FOR ELECTRONIC EQUIPMENT AND COMPUTER APPARATUS

(75) Inventors: Takehiko Noguchi, Tokyo-to (JP); Masato Anzai, Machida (JP)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 09/708,401

(22) Filed: Nov. 8, 2000

(30) Foreign Application Priority Data

Nov. 11, 1999 (JP) .......................................... 11-321385

(51) Int. Cl.[7] ................................................. H05K 7/20
(52) U.S. Cl. ........................ 361/700; 361/704; 361/687; 165/104.33; 174/15.2
(58) Field of Search ............................... 361/687, 700, 361/704, 705, 706, 707, 699; 165/104.33, 86, 104.21, 104.26; 174/15.2

(56) References Cited

U.S. PATENT DOCUMENTS

| | | | | |
|---|---|---|---|---|
| 5,588,483 A | * | 12/1996 | Ishida | .......................... 165/86 |
| 6,078,499 A | * | 6/2000 | Mok | .......................... 361/687 |
| 6,097,596 A | * | 8/2000 | Cipolla et al. | .............. 361/687 |
| 6,288,896 B1 | * | 9/2001 | Hsu | .......................... 361/687 |
| 6,377,452 B1 | * | 4/2002 | Sasaki et al. | ............... 361/687 |

* cited by examiner

Primary Examiner—Lynn D. Feild
(74) Attorney, Agent, or Firm—Carlos Munoz-Bustamante

(57) ABSTRACT

A radiation structure is employed in electronic apparatus such as a laptop computer having a body containing a heat generating element (e.g. CPU) and a display, rotatably connected to the body. The radiation structure transfers heat from the CPU to the outside of the apparatus and includes a first heatpipe; a hinge member connected to the host heatpipe for receiving heat therefrom; a second heatpipe for transferring heat from the hinge member to a radiation member placed in the display, one end of the second heatpipe being arranged substantially coaxially with the center of rotation of the display; and a sleeve member arranged in the hinge member coaxially with respect to the center of rotation of the display, the sleeve member being inserted from the outside into the inside of the display together with a portion of the second heatpipe which projects from the hinge member.

12 Claims, 4 Drawing Sheets

RADIATION STRUCTURE FOR ELECTRONIC EQUIPMENT AND COMPUTER APPARATUS

BACKGROUND OF THE INVENTION

1. Field of the Invention

The present invention relates to electronic equipment such as a notebook-type personal computer or word processor which is configured to have a display part rotationally supported by a body and relates to a radiation structure for radiating heat from a heating element such as a CPU placed in the body to the outside of the equipment as well as to electronic equipment or a computer apparatus which has such a radiation structure.

2. Description of the Related Art

Recently, as electronic equipment such as a notebook-type personal computer (hereinafter referred to as "notebook computer") becomes more advanced and faster, various electronic elements represented by a central processing unit (CPU), which may produce heat, tend to produce more and more heat. In particular, since more power consumption of an electronic element for faster operations facilitates a rise in temperature of the electronic element, some protection may be required against such a temperature rise.

Insufficient protection against radiation from such electronic equipment may cause the electronic element to have an increased error rate due to such a temperature rise or to be made unstable because of increased actuations of a protective circuit and thus, the service life of the equipment may be reduced due to a thermally degraded electronic element. In order to avoid these problems, various types of electronic equipment employ some radiation structure as a heat protection.

FIG. 5 shows a heatpipe hinge radiation mechanism as an example for a conventional radiation structure used for a notebook computer. The notebook computer includes a body 10 and a display part 12 and the display part 12 is rotationally connected to the body 10 through a hinge (not shown) to allow the display part 12 to function as a cover for the body 10 as well. It should be noted that a CPU (not shown) and other components are contained in the body 10. It should also be noted that the display part 12 has a liquid crystal display part (LCD) 13 and some other components built therein.

The conventional heatpipe hinge radiation mechanism 14 shown in FIG. 5 transfers heat produced in the body 10 to the display part 12 to suppress any temperature rise within the body 10 and on its outer surface of the body 10. The heatpipe hinge radiation mechanism 14 includes a heat sink 16 provided within the body 10. The heat sink 16 takes the form of thick plate and is supported above a CPU (not shown) mounted on a printed circuit board. The heat sink 16 is in contact with the CPU directly or indirectly through a cushioning material with a high thermal conductivity such as silicone rubber to absorb any heat from the CPU or other electronic components.

One end of the heatpipe 18 is connected to the end of the heat sink 16. The heatpipe hinge radiation mechanism 14 includes a heatpipe hinge 20 for connecting the body 10 and the display part 12. The heatpipe hinge 20 connects the body 10 to the display part 12 rotationally with respect thereto. However, the body 10 is also connected to the display part 12 by a hinge (not shown) rotationally with respect thereto and any load of the body 10 and the display part 12 is supported by the hinge mechanism to prevent it from directly acting on the heatpipe hinge 20.

The heatpipe hinge 20 includes a fixed plate 22 fixed to a chassis (not shown) within the body 10 and the other end of the heatpipe 18 is connected to the fixed plate 22. The fixed plate 22 includes a rotationally annular bearing 24 integrally provided along the upper longitudinal edge and one end of another heatpipe 26 is rotationally inserted into the bearing 24. Therefore, the fixed plate 22 is connected to the heatpipe 26 rotationally with respect thereto around the axis S of the bearing 24.

A portion of the heatpipe 26 which projects from the bearing 24 passes through a cylindrical sleeve 27 and then it is inserted into the display part 12. It should be noted that the fixed plate 22 and the sleeve 27 are made of a metal material with a high thermal conductivity, respectively. This allows the heatpipe 22 to receive any heat directly from the fixed plate 22 and indirectly from the fixed plate 22 through the sleeve 27.

On the contrary, a thin-plate radiation plate 28 is arranged on the back of the LCD 13 in the display part 12. The radiation plate 28 is also made of a metal material with a high thermal conductivity and the other end of the heatpipe 26 is connected thereto.

In the heatpipe hinge radiation mechanism 14 as configured above, any heat produced by the CPU and other components during the operation of the notebook computer is absorbed by the heat sink 16 and the heat stored in the heat sink 16 is transformed to the radiation plate 28 through the heatpipe 18, the heatpipe hinge 20, and the heatpipe 26. This allows the heat produced in the body 10 to be efficiently transferred to the radiation plate 28 of the display part 12 for heat emission from the radiation plate 28 to the outside of the apparatus and thus, any excessive rise in temperature can be avoided both within the body 10 and on the outer surface of the body 10.

Although the heatpipe hinge radiation mechanism 14 as described above consists of a plurality of parts such as heat sink 16, the heatpipes 18 and 26, and the heatpipe hinge 20, it is supplied in the form of a single finished part to the process for assembling notebook computers. During that process, the heatpipe hinge radiation mechanism 14 is first built into a housing 15 which constitutes the outer shell of the display part 12 together with the LCD 13 and other components so as to be integral with the display part 12. The fixed plate 22 of the heatpipe hinge radiation mechanism 14 integral with the display part 12 is fixed to the chassis (not shown) in the body 10 and thus, the display part 12 is rotationally connected to the body 10.

Therefore, the heatpipe 18 and the heat sink 16 are exposed to the outside until the heatpipe hinge radiation mechanism 14 is built into the body 10 together with the display part 12. The heat sink 16 is connected to the display part 12 through the heatpipe 18 only. Thus, when any load other than the moment rotating around the axis S acts between the heat sink 16 and the display part 12, that load will act as a bending or torsional load on the heatpipes 18 and 26.

The heatpipes 18 and 26 are formed of, for example, metal or any other heat conductor such as copper, aluminum, and stainless steel and have a thinner wall to increase heat transfer (endothermic and radiative) speeds near the opposite ends. This will prove that a slight load may easily cause bending, buckling, fracture, or any other breakage, resulting in decreased heat transport capacities or incapacity for heat transport. The display part 12 is handled very carefully during the notebook computer assembly process in order to avoid such breakage of the heatpipe hinge radiation mechanism 14, but the heatpipes 18 and 26 may be damaged by getting the heat sink 16 snagged on something or imposing an inappropriate load on the heatpipes 18 and 26 during the transportation of the display part 12 or its assembly into the body 10. In addition, when the display part 12 is removed from the body 10 for repair of the notebook computer, the heatpipes 18 and 26 of the display part 12 removed from the body 10 may be easily damaged.

The display part 12 is usually held on a tray or pallet or in a storage container corresponding to its shape until it is incorporated with the body 10. However, the storage container may be complicated if it is intended to prevent an inappropriate load from being imposed on the heatpipes 18 and 26, resulting in a large space required to hold the display part 12 together with the storage container and difficulty in efficiently transporting the display part 12 together with the storage container.

SUMMARY OF THE INVENTION

An embodiment of the present invention is a radiation structure applicable to electronic equipment such as a notebook-type personal computer, word processor, or PDA (Personal Data Assistant) with a body and a display part, which comprises a first heatpipe for transferring heat from a heating element contained in the body; a hinge member connected to the first heatpipe for receiving heat from the first heatpipe; a second heatpipe for transferring heat from the hinge member to a radiation member placed in the display part, one end of the second heatpipe arranged substantially coaxially with respect to the center of rotation of the display part being connected to the hinge member rotationally with respect thereto; and a sleeve member arranged in the hinge member coaxially with respect to the center of rotation of the display part, the sleeve member being inserted from the outside into the inside of the display part together with a portion of the second heatpipe which projects from the hinge member.

According to the radiation structure as configured above, when the hinge member is built into the display part together with the second heatpipe, the second heatpipe will not be exposed to the outside between the hinge member and the display part. Therefore, the second heatpipe can be protected from any breakage which may be caused by something hitting against the second heatpipe before the display part is incorporated with the body together with the first heatpipe and the hinge member.

In the radiation structure as configured above, since the sleeve member can be supported by the display part rotationally around the center of rotation of the display part, any external load acting on the hinge member and the display part will not affect directly the second heatpipe because the load is supported by the sleeve member. Therefore, it the sleeve member has a sufficiently high rigidity, the second heatpipe can be prevented from being broken even when any external load is imposed on the hinge member and the display part.

In the radiation structure as configured above, since the hinge member can be divided into a first hinge to which the first heatpipe is connected and a second hinge to which the second heatpipe is connected rotationally with respect thereto and which has the sleeve member provided therewith and is connected to the first hinge, no external load will affect directly the first heatpipe if the second heatpipe is built into the display part and the first hinge is built into the body so that the first heatpipe is supported by the body and the first hinge before the display is incorporated with the body. Therefore, the first heatpipe can be prevented from being broken under any external load when the display part is incorporated with the body.

The radiation structure as configured above can also transfer heat from the heat element in the body to the display part through heat conduction even if a first heat conductor and a second heat conductor both of which are made of a material with a sufficiently high heat conductivity are substituted for the first heatpipe and the second heatpipe, respectively. In this case, the first and second heat conductors can be made of various materials including, for example, metal materials such as copper and aluminum and nonmetallic materials which have a sufficiently high heat conductivity.

DETAILED DESCRIPTION OF THE INVENTION

Now, a heatpipe hinge radiation mechanism according to an embodiment of the present invention will be described below with reference to the drawings.

Figure 1:
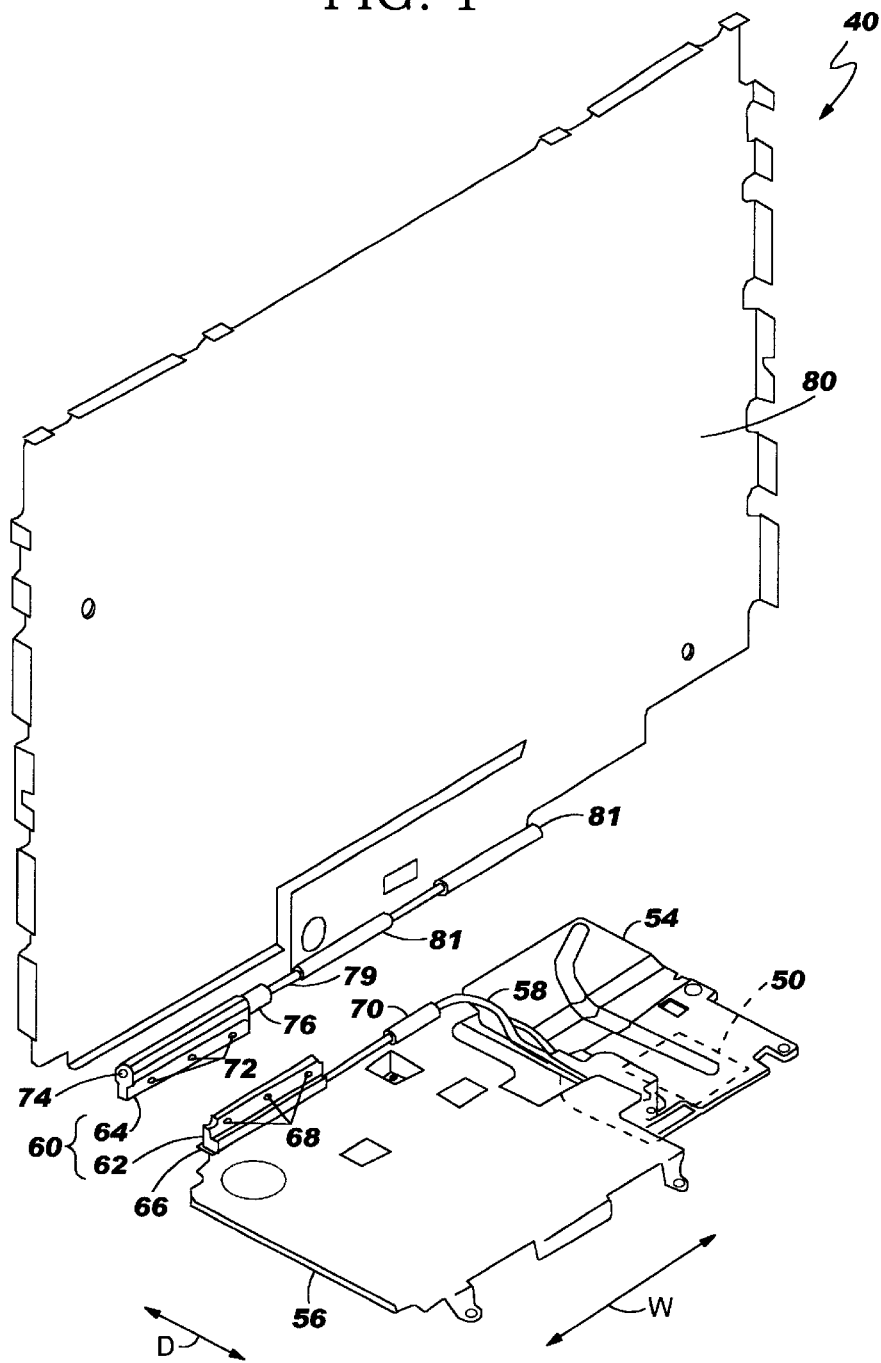
FIG. 1 is a perspective view for showing the configuration of a heatpipe hinge radiation mechanism according to an embodiment of the present invention.
Figure 2:
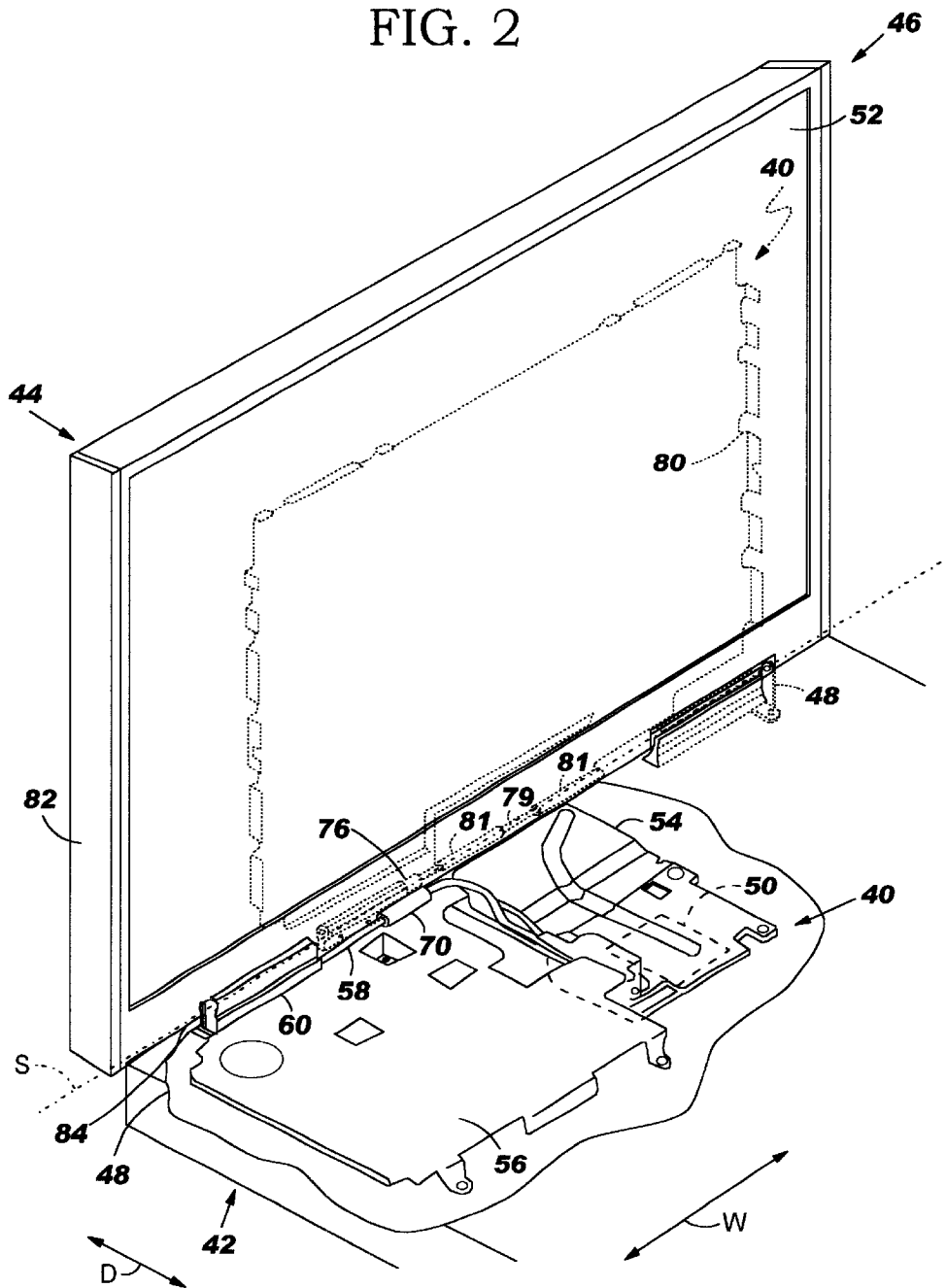
FIG. 2 is a perspective view for showing that the heatpipe hinge radiation mechanism according to an embodiment of the present invention is built into a notebook computer.

FIGS. 1 and 2 show a heatpipe hinge radiation mechanism according to an embodiment of the present invention. The heatpipe hinge radiation mechanism 40 is applicable to a notebook computer 46 having a body 42 and a display part 44 as shown in FIG. 2 and transfers heat produced in the body 42 to the display part 44 to suppress any temperature rise within the body 42 and on the outer surface of the body 42.

In the notebook computer 46, the display part 44 is connected to the body 42 by a pair of hinges 48 as shown in FIG. 2, which allows the body 42 and the display part 44 to rotate around the axis S with respect to each other. The hinges 48 function as a friction mechanism to keep the display part 44 at a predetermined angle with respect to the body 42 under no external force.

As shown in FIG. 2, the body 42 contains various electronic components such as a CPU 50 which may produce a relatively large amount of heat. The display part 44 is assembled so that a portion of a liquid crystal display part (LCD) 52 which may produce a relatively small amount of heat is exposed to the outside. Thus, only a small portion of the total amount of heat produced during the operation of the notebook computer 46 may be produced within the display part 44 and the remaining large portion of it may be produced by the electronic components in the body 42.

The heatpipe hinge radiation mechanism 40 includes a plate-like heat sink 54 provided within the body 42 and made of aluminum. The heat sink 54 is fixed to a metal chassis 56 in the body 42 and is supported by the chassis 56 above a circuit board (not shown) on which a CPU 50 is to be mounted. The underside of the heat sink 54 is in contact with the top surface of the CPU 50 directly or indirectly through a cushioning material (not shown) with a high thermal conductivity such as silicone rubber. This allows the heat produced from the CPU 50 to be transferred to the heat sink 54 through the cushioning material by means of its heat conduction and then to be stored in the heat sink 54. It should be noted that the heat transfer from the CPU 50 to the heat sink 54 does not need to be accomplished through heat conduction only and that it may be accomplished through thermal emissivity or convection by means of airspace as a medium or through any combination of heat conduction, thermal emissivity, and convection.

On the side edge of the heat sink 54, a U-shaped groove is formed along the direction of the depth of the notebook computer 46 (as shown by the arrow D in FIG. 2) and one end of a heatpipe 58 in the direction of the length is inserted into the groove and then fixed to it through press fit or caulking. It should be noted that the heatpipe 58 is a pipe made of a metal material having a good heat conductivity (for example, copper, nickel, and stainless steel) and its inside is decompressed to provide a closed space in which pure water is enclosed as operating fluid. With this configuration, the operating fluid is heated at a heating end (one end) of the heatpipe 58 for vaporization and the vapor is cooled at the opposite cooling end (the other end) to return to its fluid state with radiation. Then the operating fluid is returned to the heating end for vaporization again and such a circulation is repeated for heat transport. It should be noted that the operating fluids to be enclosed in the heatpipe 58 vary with the operating temperature and that a low-cost and efficient water is a suitable operating fluid when used for a relatively lower temperature zone (300° C. or lower) as in this embodiment.

Figure 3:
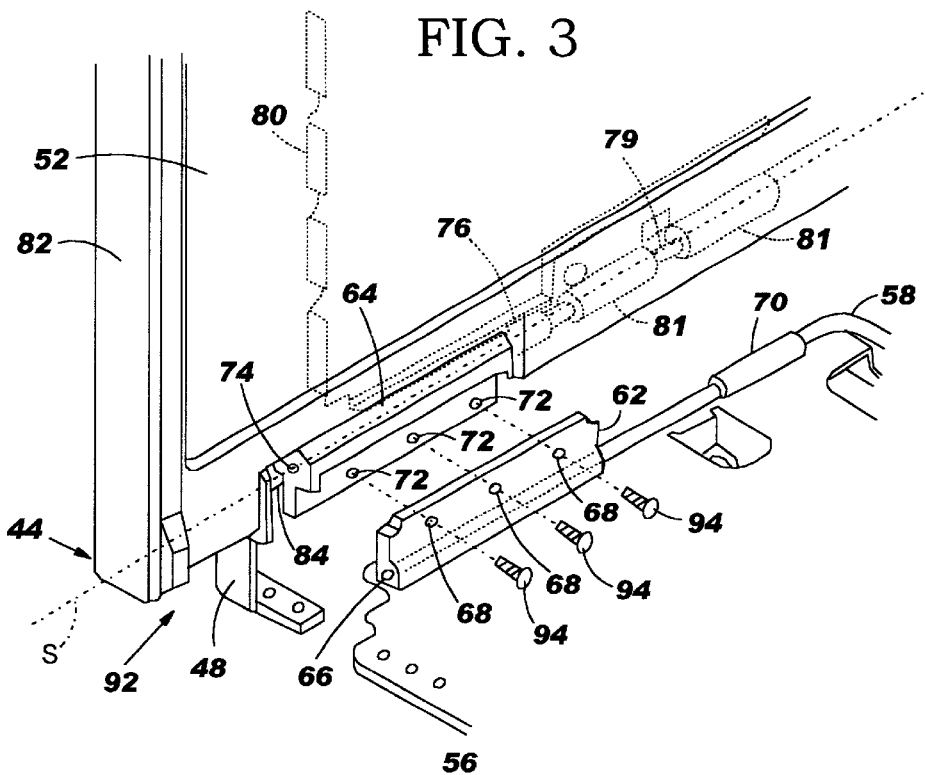
FIG. 3 is a perspective view for showing that a pair of hinges in the heatpipe hinge according to an embodiment of the present invention are disassembled.

The heatpipe hinge radiation mechanism 40 includes a heatpipe hinge 60 to connect the body 42 and the display part 44. The heatpipe hinge 60 is a two-part structure which consists of hinges 62 and 64 arranged on the body 42 and the display part 44, respectively, as shown in FIG. 3. It should be noted that the hinges 62 and 64 are formed of a metal material having high heat conductivity such as aluminum or a nonmetallic material having high heat conductivity.

As shown in FIG. 3, the hinge 62 is a substantially rectangular plate having the length in the direction of the width of the notebook computer 46 (as shown by the arrow W) and its underside is fixed to the chassis 56. The hinge 62 has a cylindrical insertion hole 66 formed along the lower edge in parallel relation with respect to the axis S and the other end of the heatpipe 58 is inserted into the insertion hole 66 and fixed to it through caulking or press fit. It should be noted that any space between the internal surface of the insertion hole 66 and the external surface of the heatpipe 58 may be filled with grease of a high heat conductivity to reduce heat transfer resistance between them. In addition, the hinge 62 has three through-holes 68 running through in the direction of its thickness in the upper portion.

A tubular pipe holder 70 is integrally formed on the edge of the chassis 56 near the display part 44 and a portion of the heatpipe 58 between the heat sink 54 and the hinge 62 runs through the pipe holder 70. This configuration allows the heatpipe 58 to be supported by the heat sink 54, the chassis 56, and the hinge 62, resulting in no external load imposed on the heatpipe 58 through the heat sink 54, the chassis 56, and the hinge 62.

On the contrary, the hinge 64 of a shape corresponding to the hinge 62 is arranged on the display part 44 as shown in FIG. 3. The hinge 64 is a substantially rectangular plate which has the upper portion thicker than the lower portion. The hinge 64 has three threaded holes 72 corresponding to the three through-holes 68 in the lower portion and it has a cylindrical insertion hole 74 formed along the direction of the width in the upper portion.

A cylindrical sleeve member 76 is integrally formed on the inner side edge of the hinge 64 as shown in FIG. 1. The sleeve member 76 has a cylindrical cavity 78 formed coaxially therewith in communication with the insertion hole 74 and the inside diameter of the cavity 78 is equal to that of the insertion hole 74. In addition, the sleeve member 76 is made of the same material as for the hinge 64 and has a sufficiently higher strength than a plastic housing 82.

Figure 4:
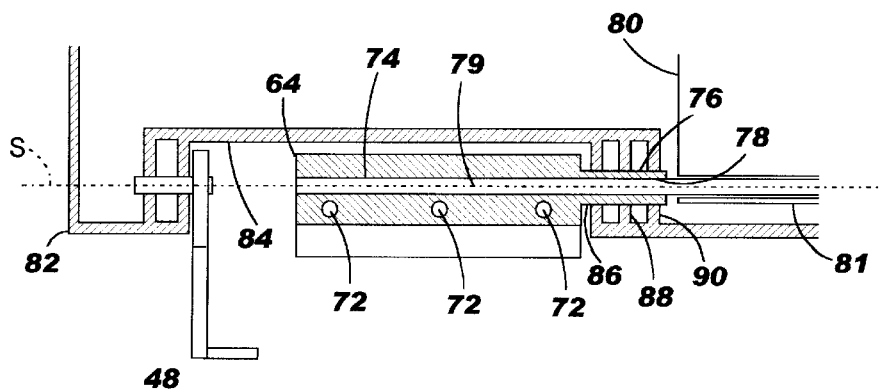
FIG. 4 is a cross section for showing a connection between the display part an the heatpipe hinge according to an embodiment of the present invention.
Figure 5:
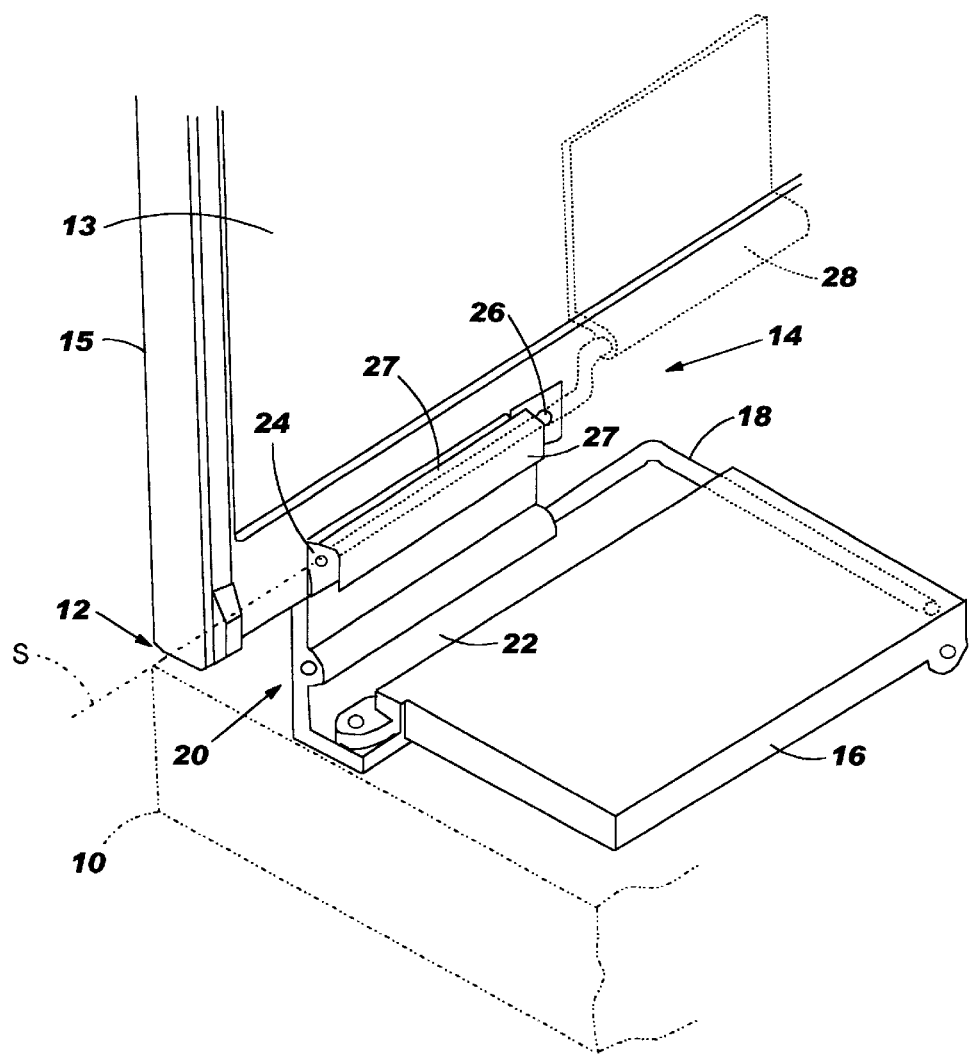
FIG. 5 is a perspective view for showing another heatpipe hinge radiation mechanism according to the prior art, which is currently finding wide application in notebook computers.

One end of a heatpipe 79 is rotationally inserted into the insertion hole 74 of the hinge 64 and the cavity 78 of the sleeve member 76 as shown in FIG. 4. The heatpipe 79 has a similar structure to that for the heatpipe 58 arranged on the body 42. In addition, the heatpipe 79 has a substantially straight shape and it is supported to be coaxial with the axis S of the hinge 48. It should be noted that any space between the internal surfaces of the insertion hole 74 and the cavity 78 and the external surface of the heatpipe 79 may be filled with grease of a high heat conductivity to reduce heat transfer resistance and rotational resistance between them.

The other end of the heatpipe 79 is connected to a radiation plate 80 as shown in FIG. 2. The radiation plate 80 is made of a metal material having high heat conductivity such as aluminum, stainless steel, and copper or a nonmetallic material having high heat conductivity and it is fixed to the backside of the LCD 52 in the display part 44. A pair of tubular connections 81 are integrally formed on the lower edge of the radiation plate 80 and a portion of the heatpipe 79 near its other end is inserted into the pair of connections 81 and fixed to them through caulking.

The housing 82 which constitutes the outer shell of the display part 44 includes a hinge receiver 84 upwardly recessed in the lower portion as shown in FIG. 4 and the upper portion of the hinge 48 and the hinge 64 of the heatpipe hinge 60 are stored in the hinge receiver 84. The inner wall of the hinge receiver 84 of the housing 82 has a support hole 86 formed coaxially with the axis S and a pair of annular bearings 88 and 90 are integrally formed on the inside of the inner wall to be coaxial with the support hole 86. The sleeve member 76 of the hinge 64 is rotationally inserted into the support hole 86 and the bearings 88 and 90 and the tip of the sleeve member 76 projects from the bearing 90 into the housing 82. This configuration allows the hinge 64 to be connected to the display part 44 rotationally around the axis S with respect to the display part 44. In addition, since a portion of the heatpipe 79 which projects from the hinge 64 is inserted into the housing 82 through the sleeve member 76, a portion between the hinge 64 and the display part 44 is covered with the sleeve member 76 so that it is not exposed to the outside.

During the process for assembling the heatpipe hinge radiation mechanism 40, the hinge 62 of the heatpipe hinge 60, the heatpipe 79, and the radiation plate 80 are assembled together with the display part 44 to form a display part unit 92 as shown in FIG. 3 and then the display part unit 92 is incorporated with the body 42. The incorporation of the display part unit 92 with the body 42 is accomplished by first fastening the pair of hinges 48 to the chassis 56 in the body 42 with screws (not shown), putting screws 94 into the three insertion holes 68 of the hinge 62, and thrusting the tips of the screws 94 into the three threaded holes 72 of the hinge 64, respectively, for fastening the hinge 62 to the hinge 64. This step allows the display part 44 to be connected to the body 42 rotationally around the axis S. It should be noted that any load which may act on the body 42 and the display part 44 is substantially supported by the pair of hinges 48 and no load from the body 42 and the display part 44 will act directly on the heatpipe hinge 60.

It should be further noted that the heatpipe hinge 60 supports the end portion of the heatpipe 58 and the end portion of the heatpipe 79 inserted into the pair of insertion holes 66 and 74, respectively, so that both heatpipes 58 and 79 are substantially parallel to each other and sufficiently closer to each other. This configuration allows a sufficiently large amount of heat to be transferred by the heatpipe hinge 60 in a unit time. More specifically, the distance between the two heatpipes 58 and 79 can set such that the amount of heat transferred by the heatpipe hinge 60 in a unit time approximates to the amount of heat transported by the heatpipe 58 in a unit time. It should also be noted that, if required, any space between the contacting surfaces of the hinges 62 and 64 may be filled with grease of a high heat conductivity to minimize the heat transfer resistance from the hinge 62 to the hinge 64.

In the heatpipe hinge radiation mechanism 40 as configured above, any heat produced by the CPU 50 and other electronic components in the body 42 during the operation of the notebook computer 46 is absorbed by the heat sink 54. The heat stored in the heat sink 54 is transferred to the heatpipe hinge 60 through the heatpipe 58 and then transferred to the heatpipe 79 through heat conduction in the heatpipe hinge 60. That heat is further transferred to the radiation plate 80 through the heatpipe 79. Then, the heat from the heatpipe 79 spreads in the radiation plate 80 from the lower portion near the connection 81 to the upper portion and is emitted into the display part 44 through thermal emissivity. This allows the heat produced by the CPU 50 and other components in the body 42 to be efficiently transferred through the heatpipe hinge radiation mechanism 40 into the display part 44 which is lower than the inside of the body 42 in temperature and thus, any excessive rise in temperature can be avoided both within the body 42 and on the outer surface of the body 42.

In the heatpipe hinge radiation mechanism 40 according to this embodiment as described above, when the hinge 64, the heatpipe 79, and the radiation plate 80 have been assembled together with the display part 44, no external load imposed on the hinge 64 and the display part 44 will act directly on the heatpipe 79 because the load is supported by the sleeve member 76. In addition, since a portion of the heatpipe 79 which projects from the hinge 64 is covered with the sleeve member 76, no external load imposed on the hinge 64 and the display part 44 will cause the heatpipe 79 to be broken and a portion of the heatpipe 79 between the heatpipe hinge 60 and display part 44 will not be exposed to the outside. Therefore, the heatpipe 79 can be protected from any breakage which may be caused by an inappropriate load imposed on the heatpipe 79 or something hitting against the heatpipe 79 before the display part unit 92 is incorporated with the body 42. It should be noted that a plastic bush with a good sliding capability may be used to cover the outer surface of the sleeve member 76 if abnormal sound is produced through friction between the sleeve member 76 and a portion of the housing 82 during the rotational movement of the display part 44.

Moreover, in the heatpipe hinge radiation mechanism 40, only the hinge 64, the heatpipe 79, and the radiation plate 80 may be preassembled into the display part 44 and the remaining hinge 62, the heatpipe 58, and the heat sink 54 may be preassembled into the body 42. Therefore, no load of the display part 44 will act on the heatpipe 58 during the storage or transportation. In addition, since the heatpipe 58 can be supported by the hinge 62, the chassis 56, and the heat sink 54, the heatpipe 58 can be protected from any breakage which may be caused by a load imposed on the display part 44 and the body 42.

From the foregoing, the radiation structure for electronic equipment according to the present invention can protect the heatpipe from any breakage which may be caused during its storage, transportation, or assembly before it has been built into the electronic equipment and also allow any heat produced in the body to be efficiently transferred to the display part.

What is claimed is:

1. A radiation structure for electronic equipment, which includes a body containing a heat generating element and a display part connected for rotation with respect to said body, said radiation structure comprising:

a first heatpipe for transferring heat from said heat generating element contained in said body;

a hinge member connected to said first heatpipe for receiving heat from said first heatpipe;

a second heatpipe for transferring heat from said hinge member to a radiation member placed in said display part, one end of said second heatpipe arranged substantially coaxially with respect to the center of rotation of said display part being connected to said hinge member rotationally with respect thereto; and a sleeve member arranged in said hinge member coaxially with respect to the center of rotation of said display part, said sleeve member being inserted from the outside into the inside of said display part together with a portion of said second heatpipe which projects from said hinge member.

2. The radiation structure for electronic equipment according to claim 1, wherein said sleeve member is supported by said display part rotationally around said center of rotation.

3. The radiation structure for electronic equipment according to claim 1, wherein said hinge member includes a first hinge which is fixed to said body and to which said first heatpipe is connected and a second hinge to which said second heatpipe is connected rotationally with respect thereto and which has said sleeve member provided therewith and is connected to said first hinge.

4. The radiation structure for electronic equipment according to claim 1, wherein said first heatpipe and said second heatpipe are supported at said hinge member in substantially parallel and closer relation with respect to each other.

5. A radiation structure for electronic equipment, which includes a body containing a heat generating element and a display part connected to said body rotationally with respect thereto, said radiation structure comprising:

a first heatpipe for transferring heat from said heat generating element contained in said body;

a hinge member connected to said first heatpipe for receiving heat from said first heatpipe; and a second heatpipe for transferring heat from said hinge member to said display part, one end of said second heatpipe arranged substantially coaxially with respect to the center of rotation of said display part being connected to said hinge member rotationally with respect thereto, wherein said hinge member includes a first hinge element fixed to said body and to which said first heatpipe is connected and a second hinge element to which said second heatpipe is connected rotationally with respect thereto and which is connected to said first hinge element.

6. A radiation structure for electronic equipment, which includes a body containing a heat generating element and a display part connected to said body rotationally with respect thereto, said radiation structure comprising:

a first heat conductor for transferring heat from said heat generating element contained in said body;

a hinge member connected to said first heat conductor for receiving heat from said first heat conductor;

a second heat conductor for transferring heat from said hinge member to a radiation member placed in said display part, one end of said second heat conductor arranged substantially coaxially with respect to the center of rotation of said display part being connected to said hinge member rotationally with respect thereto; and a sleeve member arranged in said hinge member coaxially with respect to the center of rotation of said display part, said sleeve member being inserted from the outside into the inside of said display part together with a portion of said second heat conductor which projects from said hinge member.

7. An electronic apparatus comprising:

a body containing a heat generating element;

a display part rotationally connected to said body; and a radiation structure comprising a first heatpipe for transferring heat from said heat generating element contained in said body;

a hinge member connected to said first heatpipe for receiving heat from said first heatpipe;

a second heatpipe for transferring heat from said hinge member to a radiation member placed in said display part, one end of said second heatpipe arranged substantially coaxially with respect to the center of rotation of said display part being connected to said hinge member rotationally with respect thereto; and a sleeve member arranged in said hinge member coaxially with respect to the center of rotation of said display part, said sleeve member being inserted from the outside into the inside of said display part together with a portion of said second heatpipe which projects from said hinge member.

8. The electronic apparatus according to claim 7 wherein said sleeve member is supported by said display part rotationally around said center of rotation.

9. The electronic apparatus according to claim 7 wherein said hinge member includes a first hinge which is fixed to said body and to which said first heatpipe is connected and a second hinge to which said second heatpipe is connected rotationally with respect thereto and which has said sleeve member provided therewith and is connected to said first hinge.

10. The electronic apparatus according to claim 7 wherein first heatpipe and said second heatpipe are supported at said hinge member in substantially parallel and closer relation with respect to each other.

11. An electronic apparatus, including a body containing a heat generating element; a display part rotatably connected to said body; and a radiation structure comprising:

a first heatpipe for transferring heat from said heat generating element contained in said body;

a hinge member connected to said first heatpipe for receiving heat from said first heatpipe; and a second heatpipe for transferring heat from said hinge member to said display part, one end of said second heatpipe arranged substantially coaxially with respect to the center of rotation of said display part being connected to said hinge member rotationally with respect thereto, wherein said hinge member includes a first hinge element fixed to said body and to which said first heatpipe is connected and a second hinge element to which said second heatpipe is connected rotationally with respect thereto and which is connected to said first hinge element.

12. An electronic apparatus including a body containing a heat generating element; a display rotatably connected to said body; and a radiation structure comprising:

a first heat conductor for transferring heat from said heat generating element contained in said body;

a hinge member connected to said first heat conductor for receiving heat from said first heat conductor;

a second heat conductor for transferring heat from said hinge member to a radiation member placed in said display part, one end of said second heat conductor arranged substantially coaxially with respect to the center of rotation of said display part being connected to said hinge member rotationally with respect thereto; and a sleeve member arranged in said hinge member coaxially with respect to the center of rotation of said display part, said sleeve member being inserted from the outside into the inside of said display part together with a portion of said second heat conductor which projects from said hinge member.

* * * * *

UNITED STATES PATENT AND TRADEMARK OFFICE
CERTIFICATE OF CORRECTION

PATENT NO. : 6,493,226 B1
DATED : December 10, 2002
INVENTOR(S) : Noguchi et al.

It is certified that error appears in the above-identified patent and that said Letters Patent is hereby corrected as shown below:

<u>Title page,</u>
Item [75], Inventors, delete and insert the following:
-- Takehiko Noguchi, Tokyo-to (JP);
 Masato Anzai, Machida (JP);
 Thomas Mario Cipolla, Katonah, NY
 Lawrence Shungwei Mok, Brewster, NY --.

Signed and Sealed this

Twenty-third Day of August, 2005

JON W. DUDAS
*Director of the United States Patent and Trademark Office*